(12) United States Patent
Kuwahara et al.

(10) Patent No.: US 7,658,522 B2
(45) Date of Patent: Feb. 9, 2010

(54) VEHICLE LAMP

(75) Inventors: Sigeru Kuwahara, Shizuoka (JP); Keiichi Tajima, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 196 days.

(21) Appl. No.: 11/865,194

(22) Filed: Oct. 1, 2007

(65) Prior Publication Data

US 2008/0225543 A1 Sep. 18, 2008

(30) Foreign Application Priority Data

Oct. 10, 2006 (JP) .............................. 2006-276545

(51) Int. Cl.
*F21V 21/15* (2006.01)
(52) U.S. Cl. ...................... 362/524; 362/523
(58) Field of Classification Search ................. 362/523, 362/524
See application file for complete search history.

(56) References Cited

U.S. PATENT DOCUMENTS

| | | | |
|---|---|---|---|
| 7,175,319 B2* | 2/2007 | Tajima et al. ............... | 362/523 |
| 7,287,887 B2* | 10/2007 | Ohshio et al. ............... | 362/523 |
| 7,315,127 B2* | 1/2008 | Tajima ....................... | 362/523 |
| 7,364,331 B2* | 4/2008 | Tajima ....................... | 362/523 |
| 2003/0002288 A1* | 1/2003 | Ravier ......................... | 362/524 |
| 2004/0085780 A1* | 5/2004 | Hayami ....................... | 362/523 |
| 2004/0208017 A1* | 10/2004 | Takiguchi et al. ........... | 362/524 |
| 2005/0141234 A1* | 6/2005 | Tajima et al. ................ | 362/524 |
| 2008/0089086 A1* | 4/2008 | Tajima et al. ................ | 362/524 |
| 2008/0106909 A1* | 5/2008 | Kusagaya .................... | 362/524 |
| 2008/0112181 A1* | 5/2008 | Tatara et al. ................. | 362/524 |
| 2008/0304278 A1* | 12/2008 | Ogino et al. ................. | 362/524 |

FOREIGN PATENT DOCUMENTS

| | | |
|---|---|---|
| JP | 2003-054310 | 2/2003 |
| JP | 2004-227933 | 8/2004 |

* cited by examiner

*Primary Examiner*—David V Bruce
(74) *Attorney, Agent, or Firm*—Fish & Richardson P.C.

(57) ABSTRACT

A headlamp is provided with a lamp unit provided in a lamp housing formed by a lamp body and a transparent cover for covering a front side of the lamp body. The lamp unit is supported in the lamp housing in a suspending state in such a condition that the lamp unit can be swung in vertical and horizontal directions. An output shaft coupled to a lower end of the lamp unit can be rotated around its axis and slide in a direction perpendicular to the axis. A rotation of the output shaft around its axis is transmitted to the lamp unit. By a movement of the output shaft in the direction perpendicular to the axis, a rotation between the output shaft and the lamp unit causes.

4 Claims, 8 Drawing Sheets

VEHICLE LAMP

This application claims foreign priority from Japanese Patent Application No. 2006-276545 filed on Oct. 10, 2006, the entire contents of which are hereby incorporated by reference.

BACKGROUND OF THE INVENTION

1. Field of the Invention

The present invention relates to a vehicle lamp. More specifically, the invention relates to a vehicle lamp which can change an irradiating direction into vertically and horizontally optional directions.

2. Related Art

Some vehicle lamps, for example, some headlamps for an automobile can change an irradiating direction into vertically and horizontally optional directions.

In a vehicle lamp described in JP-A-2004-227933, a lamp unit can be supported on a bracket to be horizontally movable and the bracket is supported on a lamp body to be vertically movable, and the horizontal movement of the lamp unit and the vertical movement of the bracket are carried out by using separate driving devices, respectively.

In the vehicle lamp described in JP-A-2004-227933, it is necessary to independently provide a driving device for horizontally changing an irradiating direction and a driving device for vertically changing the irradiating direction. Moreover, the lamp unit is not directly supported on the lamp body but is supported on the lamp body through the bracket. For this reason, the number of components is increased and a cost is necessarily increased with an increase in a component cost and an increase in an assembly man-hour.

In a vehicle lamp described in JP-A-2003-054310, furthermore, the irradiating direction is changed into the horizontal and vertical directions by a driving device using a single driving source. Consequently, it is possible to avoid an increase in the number of components and the assemblyman-hour, thereby reducing a cost.

In the vehicle lamp of JP-A-2003-054310, in a state in which a lamp unit is mounted on an output shaft of a driving device, the output shaft is rotated so that the lamp unit is horizontally swung, and furthermore, the output shaft is moved horizontally in a longitudinal direction so that the lamp unit is swung vertically with an upper end set to be a fulcrum.

In the vehicle lamp of JP-A-2003-054310, accordingly, a weight of the lamp unit is applied to the output shaft and becomes a load to a rotation and a horizontal movement of the output shaft. Therefore, an accurate position control is inhibited. Moreover, an interval between a rotatable support point of the upper end of the lamp unit and a connecting point to the output shaft is varied depending on a horizontal movement in the longitudinal direction of the output shaft. In the movement of the output shaft in a direction in which the interval is increased, therefore, a deviation between a moving locus of the output shaft and that of the connecting point to the output shaft of the lamp unit is an excess load to the movement of the output shaft so that an accurate position control is inhibited.

SUMMARY OF THE INVENTION

One or more embodiments of the invention provide a vehicle lamp which can change an irradiating direction into vertically and horizontally optional directions, decrease a number of components, and carry out an accurate control while preventing an excess load from being applied to a driving portion.

In accordance with one or more embodiments of the invention, a vehicle lamp is provided with: a lamp housing formed by a lamp body and a cover for covering a front side of the lamp body; a lamp unit configured to irradiate a light forward and suspended in the lamp housing to be swung in vertical and horizontal directions; and an irradiating direction adjusting device configured to swing the lamp unit in the vertical and horizontal directions. In the vehicle lamp, the irradiating direction adjusting device includes an output shaft coupled to a lower end of the lamp unit. The output shaft is capable of rotating on its axis and sliding in a direction perpendicular to the axis. The lamp unit is swung in the horizontal direction by transmitting a rotation of the output shaft to the lamp unit. The lamp unit is swung in the vertical direction by sliding the output shaft in the direction perpendicular to the axis.

Accordingly, a number of components is decreased and a weight of the lamp unit is not applied to the output shaft.

Moreover, according to the vehicle lamp, it is possible to change the irradiating direction into two directions including the horizontal direction and the vertical direction by means of a single irradiating direction adjusting device. Therefore, the number of components can be decreased, resulting in a contribution to a reduction in a cost. Furthermore, the lamp unit is supported in a suspending state and a weight of the lamp unit is not applied to the output shaft of the irradiating direction adjusting device. Therefore, an excess load is not applied to the irradiating direction adjusting device so that an accurate adjustment of the irradiating direction can be carried out. By a movement of the output shaft in a forward-rearward direction, furthermore, a rotation is generated between the output shaft and the lamp unit. Therefore, it is possible to carry out an accurate position control without applying an excess load to the output shaft.

The vehicle lamp may be provided with a case fixed to the lamp body and a slider provided in the case and slidable in the forward-rearward direction. The output shaft may be supported on the slider and rotatable with respect to the slider. Therefore, it is possible to independently carry out the horizontal and vertical changes of the irradiating direction without a mutual interference of the rotation and the slide of the output shaft.

An upper end of the lamp unit may be provided with a suspended portion having a downward convex spherical surface, and an inside of the lamp housing may be provided with a unit receiving portion. The unit receiving portion may have a hemispherical receiving concave portion with which the convex spherical surface comes in sliding contact, and a regulating portion for regulating an upward movement of the suspended portion. Therefore, it is possible to desirably set a size of the convex spherical surface of the suspended portion and that of the receiving concave portion. Consequently, it is possible to maintain a desirable suspending strength.

The suspended portion may include a hemispherical presses concave portion formed on an upper surface of the suspended portion. The regulating portion may include a hemispherical pressing protrusion to come in sliding contact with the pressed concave portion. Therefore, it is possible to reliably prevent the upward movement of the lamp unit, thereby preventing a looseness from being generated in the attachment of the lamp unit.

The regulating portion may be fixed to the unit receiving portion from a forward side with a screw. Consequently, a sliding mold is not required for molding in a portion to support the lamp unit in the lamp housing. Thus, it is possible to contribute to a reduction in a molding cost.

Other aspects and advantages of the invention will be apparent from the following description and the appended claims.

DETAILED DESCRIPTION OF THE EXEMPLARY EMBODIMENTS

Exemplary embodiments of the invention are described with reference to the drawings. In the exemplary embodiments shown in the drawings, the invention is applied to a headlamp for an automobile.

FIGS. 1 to 4 show a first exemplary embodiment.

Figure 1:
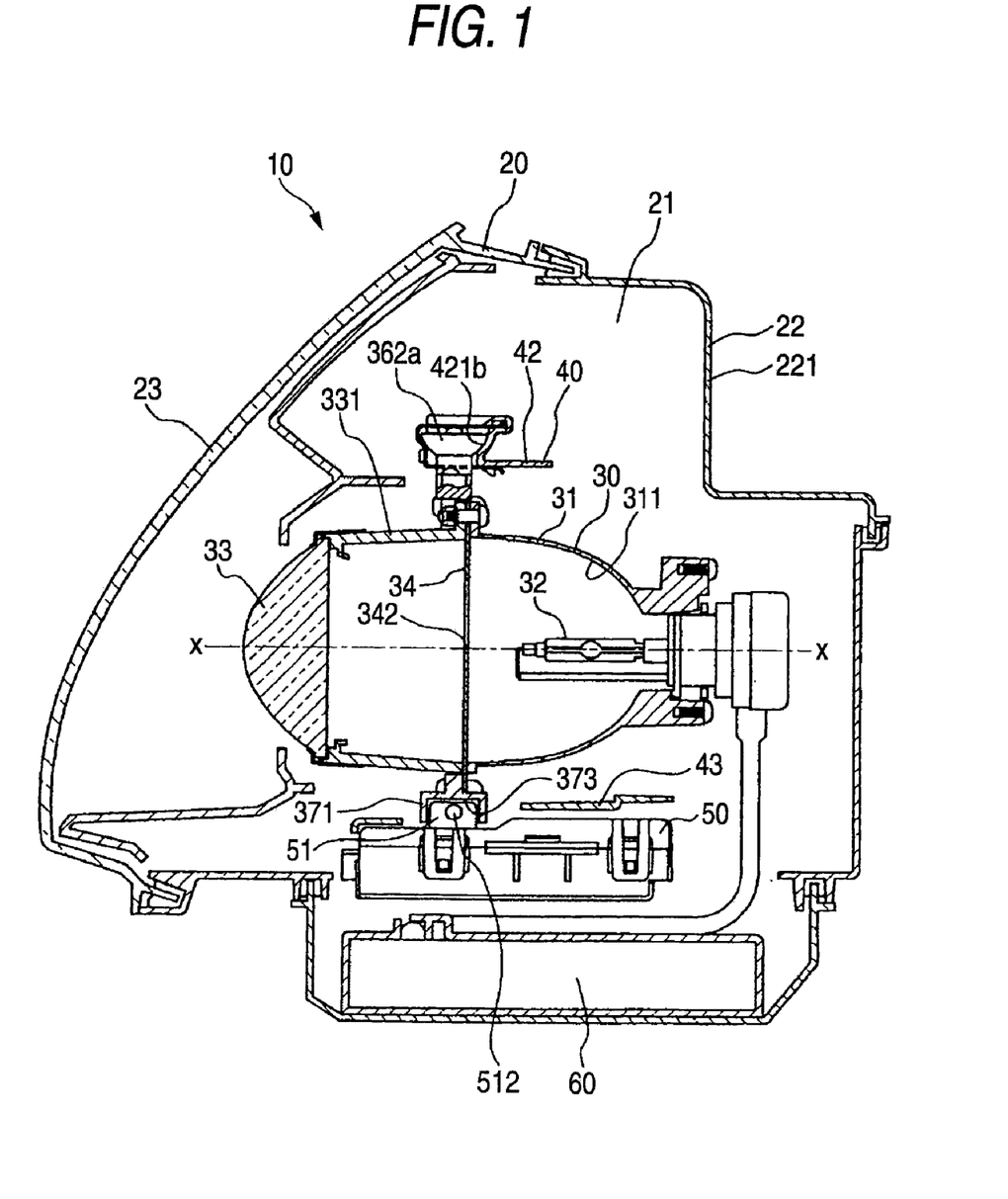
FIG. 1 is a longitudinal sectional view showing an exemplary embodiment of a vehicle lamp according to the invention together with FIGS. 2 to 4, illustrating a whole portion.

Referring to FIG. 1, description will be given to the summary of the headlamp for an automobile.

In a headlamp 10, a lamp unit 30 is disposed in a housing 20 so as to be rotatable in vertical and horizontal directions. The lamp housing 21 is an almost closed space. The housing 20 is configured by a lamp body 22 having a front opening and a transparent cover 23 covering the front opening of the lamp body 22

The lamp unit 30 is supported on the lamp body 22 through a bracket 40 so as to be vertically and horizontally rotatable in the headlamp 10. Further, the lamp unit 30 may be directly supported on the lamp body 22 so as to be vertically and horizontally rotatable.

A biaxial actuator 50 as an irradiating direction adjusting device is supported on the bracket 40. The lamp unit 30 supported on the bracket 40 so as to be vertically and horizontally rotatable is coupled to an output portion of the biaxial actuator 50.

Moreover, a discharge lamp lighting circuit 60 is disposed in the housing 20. The lamp unit 30 is turned on by the discharge lamp lighting circuit 60.

Figure 2:
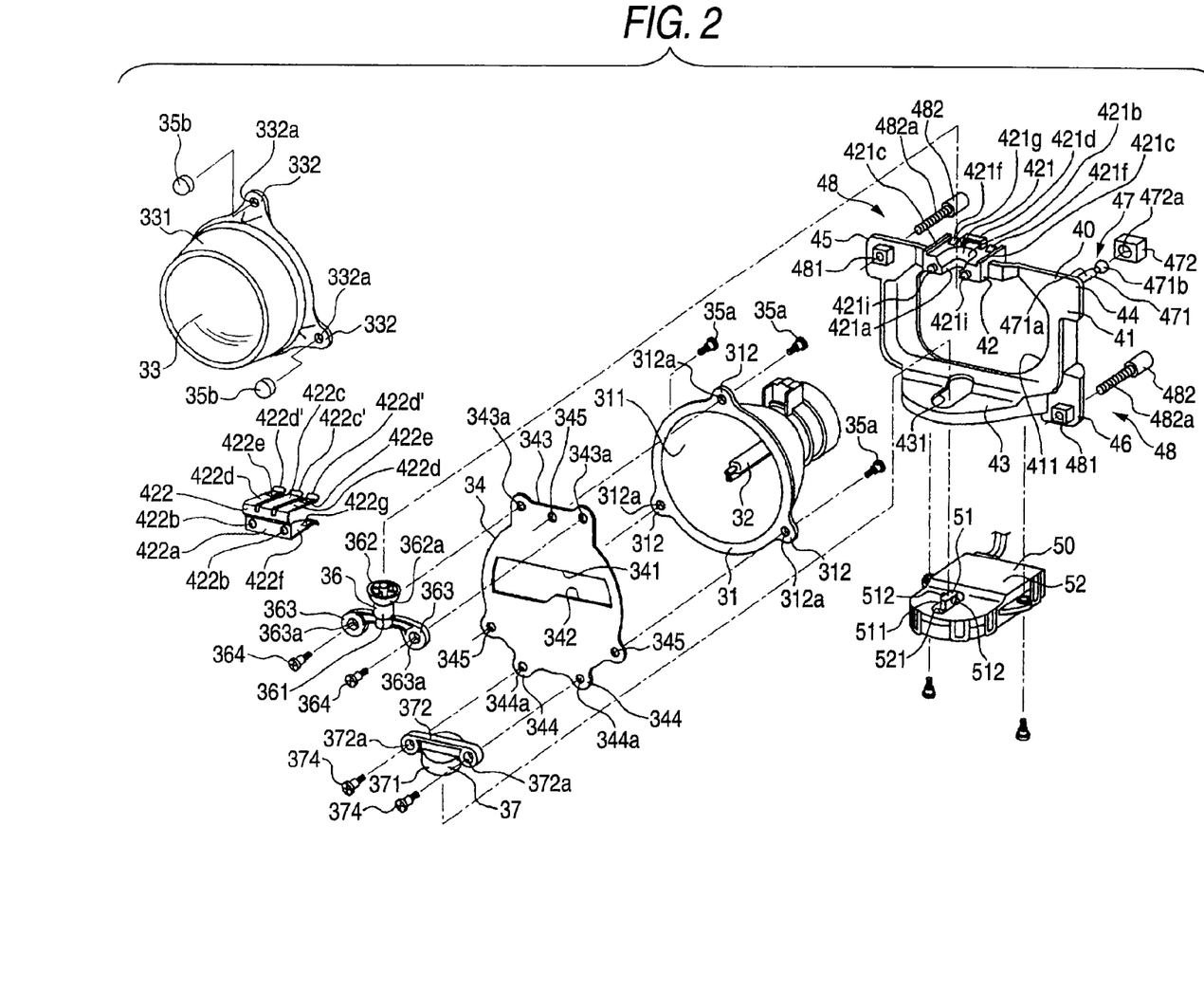
FIG. 2 is an exploded perspective view showing main parts.

As shown in FIGS. 1 and 2, the lamp unit 30 includes a reflector 31, a discharge lamp 32 held on the reflector 31, a projection lens 33 for forward projecting a light of the discharge lamp 32, and a shade 34 for shaping the light of the discharge lamp 32 into a desirable pattern.

The reflector 31 has a reflecting surface 311 for collecting the light of the discharge lamp 32. For example, the reflecting surface 311 has a vertical section taking an elliptical shape or an almost close shape to an ellipse, and a horizontal section taking a paraboloid or a close section to the paraboloid. The reflecting surface 311 collects the light of the discharge lamp 32 positioned behind a focal point of the paraboloid on a first focal point of the ellipse in such a state as to have a slight expansion in a horizontal direction on a second focal point of the ellipse.

The projection lens 33 is a condenser lens having a front surface to be a convex spherical surface and a rear surface to be an almost plane, and is held on a lens holder 331. The lens holder 331 is attached to a front end of the reflector 31 so that the projection lens 33 is positioned in such a manner that a rear focal point thereof is placed in the condensing region, that is, a region in which the light of the discharge lamp 32 is collected. The lens holder 331 has three attached pieces 332, 332 and 332 protruded outward, and the attached pieces 332, 332 and 332 have inserting holes 332a, 332a and 332a formed thereon. Moreover, three attaching pieces 312, 312 and 312 protruded outward are formed on a front end of the reflector 31, and the attaching pieces 312, 312 and 312 have inserting holes 312a, 312a and 312a formed thereon. Therefore, attaching screws 35a, 35a and 35a inserted forward through the inserting holes 312a, 312a and 312a of the reflector 31 are inserted through the inserting holes 332a, 332a and 332a of the lens holder 331, and nuts 35b, 35b and 35b are screwed into portions of the attaching screws 35a, 35a and 35a which are protruded forward from the attached pieces 332, 332 and 332. Consequently, the projection lens 33 is supported on the reflector 31 through the lens holder 331.

The shade 34 is held in such a state that it is interposed between the reflector 31 and the lens holder 331. The shade 34 takes a shape of a slightly larger plate than an open surface of the front end of the reflector 31, and has a horizontally long light transmitting hole 341 formed on an almost central part in a vertical direction and a lower side edge 342 of the light transmitting hole 341 is set to be a cutoff limiting edge. A shaft fixing portion 343 is protruded from an upper end of the shade 34 and screw holes 343a and 343a are formed on both ends of the shaft fixing portion 343. Moreover, joint fixing portions 344 and 344 are protruded from a lower end of the shade 34, and screw holes 344a and 344a are formed on the joint fixing portions 344 and 344. Furthermore, a peripheral edge portion of the shade 34 is provided with two fixed holes 345 and 345 separated horizontally at a lower end and one fixed hole 345 on a center of an upper end.

As described above, when the reflector 31 is fixed to the lens holder 331, the shade 34 is positioned between the reflector 31 and the lens holder 331 and the attaching screws 35a, 35a and 35a inserted through the inserting holes 312a, 312a and 312a of the reflector 31 are first inserted through the fixed holes 345, 345 and 345 of the shade 34 and are then inserted through the inserting holes 332a, 332a and 332a of the lens holder 331. As described above, in a state in which the shade 34 is fixed between the reflector 31 and the lens holder 331, the shaft fixing portion 343 is protruded further upward from upper ends of the reflector 31 and the lens holder 331, and furthermore, the joint fixing portions 344 and 344 are protruded in a horizontal separating state from lower ends of the reflector 31 and the lens holder 331.

As described above, in the state in which the shade 34 is fixed between the reflector 31 and the lens holder 331, the cutoff limiting edge 342 of the shade 34 is positioned on the rear focal point of the projection lens 33 or in the vicinity thereof (the condensing region or the vicinity thereof).

When the discharge lamp 32 is turned on, accordingly, the light is reflected by the reflecting surface 311 of the reflector 31 and is collected into the vicinity of the cutoff limiting edge 342 of the shade 34. A lower part of the light collected in the collecting region is shielded by the shade 34, and the light shielded partially is inverted and projected forward by the projection lens 33. Therefore, a beam in a pattern having a cutoff line limited by the cutoff limiting edge 342 of the shade 34 on an upper edge is projected forward.

It is desirable that the shade 34 should be positioned in the vicinity of a position of a center of gravity in the lamp unit 30.

A suspended portion 36 formed by a resin is fixed to the shaft fixing portion 343. The suspended portion 36 is constituted by integrally forming a rotating shaft 361 extended in an almost vertical direction, a supported portion 362 formed integrally with an upper end of the rotating shaft 361, and supported pieces 363 and 363 protruded in an almost horizontal direction from a lower end of the rotating shaft 361. The supported portion 362 takes a hemispherical shape having a larger diameter than the rotating shaft 361, and has a lower surface provided with a convex spherical surface 362a protruded hemispherically downward. Accordingly, the rotating shaft 361 is protruded downward from a central part of the convex spherical surface 362a. Moreover, inserting holes 363a and 363a are formed on the tip portions of the supported pieces 363 and 363. Fixing screws 364 and 364 inserted through the inserting holes 363a and 363a of the supported pieces 363 and 363 from a front are screwed into the screw holes 343a and 343a of the shaft fixing portion 343 formed on the shade 34. Consequently, the suspended portion 36 is fixed to the upper end of the lamp unit 30 through the shade 34.

A joint member 37 formed by a resin is fixed to the joint fixing portions 344 and 344. The joint member 37 is constituted by integrally forming a coupling portion 371 to be coupled to an output shaft of the biaxial actuator 50 which will be described below and a fixed portion 372 provided on an upper surface of the coupling portion 371 and having both ends protruded horizontally from a peripheral edge of the coupling portion 371, and inserting holes 372a and 372a are formed on both ends of the fixed portion 372. The coupling portion 371 takes a shape of a thick disc and has an opened coupling concave portion 373 formed on a lower surface. As is apparent from FIG. 3, the coupling concave portion 373 is formed to take a shape of an almost cross, and longitudinal portions 373a and 373a are formed widely and horizontal protruded portions 373b and 373b are formed to be narrower than the longitudinal protruded portions 373a and 373a. Fixing screws 374 and 374 inserted through the inserting holes 372a and 372a from a front are screwed into the screw holes 344a and 344a of the joint fixing portions 344 and 344 formed on the shade 34. Consequently, the joint member 37 is fixed to a lower end of the lamp unit 30 through the shade 34.

The lamp unit 30 is supported in a suspending state on the bracket 40 supported on the lamp body 22 to be vertically and horizontally tiltable, and can be swung vertically and horizontally with respect to the bracket 40.

As is apparent from FIGS. 1 and 2, in the bracket 40, a large opening 411 is formed on a main portion 41 taking a forward opened and shallow bowl. An upper support piece 42 is protruded forward from an upper end of the main portion 41. A lower support piece 43 is protruded forward from a lower end of the main portion 41. Coupling pieces 44, 45 and 46 are protruded from three corner parts of the main portion 41.

The lamp unit 30 is supported on the upper support piece 42 of the bracket 40 in a suspending state. A unit receiving portion 421 is formed on the support piece 42. The unit receiving portion 421 is provided with a notch 421a opened forward and taking an almost U shape seen from above. An upper surface 421b of a portion provided along an edge of the notch 421a is set to be a receiving concave portion. The receiving concave portion 421b is formed to take a concave spherical surface having an almost equal curvature to that of the convex spherical surface 362a of the suspended portion 36. Low walls 421c and 421c extended in a longitudinal direction are formed in positions restricting both side portions of the receiving concave portion 421b of the unit receiving portion 421. An inserting portion 421d is protruded from an almost central part between rear ends of the walls 421c and 421c. An inserting hole 421e opened forward is formed on the inserting portion 421d. Engagement projections 421f and 421f are formed in positions between the inserting portion 421d and rear ends of the walls 421c and 421c. The engagement projection 421f has a front surface to be an inclined surface 421g having a protrusion amount which is gradually increased rearward and a rear surface to be an engagement surface 421h which is cut and erected almost perpendicularly. Moreover, positioning projections 421i and 421i are protruded forward in positions separated horizontally of the front end face of the unit receiving portion 421. Furthermore, engagement projections 421j and 421j are formed in positions corresponding to the portions of the lower surface of the unit receiving portion 421 in which the engagement projections 421f and 421f are formed (see FIG. 4). The engagement projection 421j has a front surface to be an inclined surface 421k having a protrusion amount which is gradually increased rearward and a rear surface to be an engagement surface 421l which is cut and erected almost perpendicularly.

A regulating member 422 is coupled to the unit receiving portion 421. The regulating member 422 is formed by a metal plate having an elasticity and has a front end piece 422a taking a long rectangular shape in a horizontal direction. The front end piece 422a has positioning holes 422b and 422b formed apart from each other in a horizontal direction. Three pressing pieces 422c, 422d and 422d are protruded rearward from an upper edge of the front end piece 422a. Tip portions 422c', 422d' and 422d' of the three pressing pieces 422c, 422d and 422d are curved slightly upward. Moreover, engagement holes 422e and 422e are formed immediately behind the tip portions 422d' and 422d' of the left and right pressing pieces 422d and 422d. Furthermore, support pieces 422f and 422f are protruded rearward from both left and right side portions of a lower edge of the front end piece 422a. An engagement hole 422g is formed on a tip portion of the support piece 422f.

An inserting hole 431 extended in a longitudinal direction is formed on a central part of the lower support piece 43 of the bracket 40. A width of the inserting hole 431 is set to be slightly larger than an outside diameter of the coupling portion 371 of the joint member 37.

Figure 4:
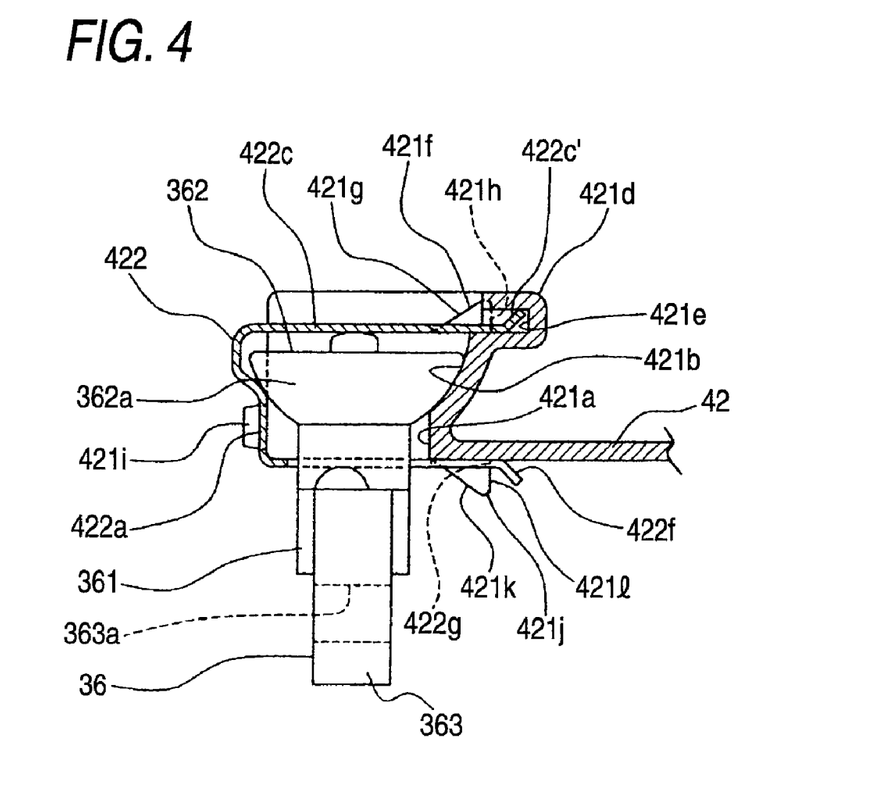
FIG. 4 is an enlarged sectional view showing a state in which a unit receiving portion and a suspended portion are assembled.

The lamp unit 30 is supported on the upper support piece 42 of the bracket 40 in the suspending state in the following manner. First of all, the rotating shaft 361 of the suspended portion 36 fixed to the lamp unit 30 is inserted into the notch 421a of the unit receiving portion 421 from a front. In a state in which the rotating shaft 361 reaches an inner part of the notch 421a, the convex spherical surface 362a of the supported portion 362 is mounted on the receiving concave portion 421b of the unit receiving portion 421. Consequently, a whole weight of the lamp unit 30 is received by the receiving concave portion 421b of the unit receiving portion 421 through the convex spherical surface 362a of the suspended portion 36. More specifically, the lamp unit 30 is supported on the upper support piece 42 of the bracket 40 in the suspending state. The convex spherical surface 362a comes in sliding contact with the receiving concave portion 421b so that the lamp unit 30 can be tilted in the vertical and horizontal directions.

In the exemplary embodiment, the suspended portion is formed hemispherically. Therefore, it is possible to increase an area of the suspended portion without increasing a dimension in the vertical direction as compared with the case of a sphere. Thus, it is possible to receive the whole weight of the lamp unit 30 by the unit receiving portion more reliably.

As described above, the lamp unit 30 is supported in the suspending state. The regulating member 422 is attached to the unit receiving portion 421 in such a manner that the rotating shaft 361 and the supported portion 362 do not slip from the unit receiving portion 421. The regulating member 422 is moved rearward in order to interpose the unit receiving portion 421 and the supported portion 362 of the suspended portion 36 between the upper pressing pieces 422c, 422d and 422d and the lower support pieces 422f and 422f. At this time, the left and right pressing pieces 422d and 422d are moved rearward along internal surfaces of the walls 421c and 421c of the unit receiving portion 421. The tip portion 422c' of the central pressing piece 422c is inserted into the inserting hole 421e of the unit receiving portion 421. Furthermore, the tip portions 422d' and 422d' of the left and right pressing pieces 422d and 422d slide upward along the inclined surfaces 421g and 421f of the engagement projections 421f and 421f of the unit receiving portion 421. Finally, the engagement projections 421f and 421f are engaged with the engagement holes 422e and 422e. Moreover, the positioning projections 421i and 421i formed on the front end face of the unit receiving portion 421 are engaged with the positioning holes 422b and 422b formed on the front end piece 422a so that the regulating member 422 is positioned with respect to the unit receiving portion 421. Furthermore, the support pieces 422f and 422f slide rearward along the lower surface of the unit receiving portion 421 and slide upward along the inclined surfaces 421k and 421k of the engagement projections 421j and 421j. Finally, the engagement projections 421j and 421j are engaged with the engagement holes 422g and 422g.

As described above, when the regulating member 422 is attached to the unit receiving portion 421, the upper surface of the supported portion 362 of the suspended portion 36 is pressed by the three pressing pieces 422c, 422d and 422d of the regulating member 422. Accordingly, the slip of the supported portion 362 from the receiving concave portion 421b is inhibited. In other words, the three pressing pieces 422c, 422d and 422d function as regulating portions for regulating the slip of the convex spherical surface 362a from the receiving concave portion 421b. In the regulating member 422, moreover, the engagement holes 422e and 422e of the two pressing pieces 422d and 422d are engaged with the engagement projections 421f and 421f of the unit receiving portion 421, and furthermore, the engagement holes 422g and 422g of the support pieces 422f and 422f are engaged with the engagement projections 421j and 421j of the lower surface of the unit receiving portion 421 so that the slip from the unit receiving portion 421 is inhibited.

The bracket 40 is supported on the lamp body 22 so as to be tiltable in vertical and horizontal directions. More specifically, the bracket 40 has the coupling piece 44 and the two coupling pieces 45 and 46 coupled to a rear wall 221 of the lamp body 22 through a rotating fulcrum portion 47 and interval adjusting portions 48 and 48, respectively.

The rotating fulcrum portion 47 is constituted by a fulcrum shaft 471 supported on the coupling piece 44 and a ball receiving member 472 supported on the rear wall 221 of the lamp body 22. The fulcrum shaft 471 has such a structure that a sphere 471b is formed on a rear end of a shaft portion 471a having a front end fixed to the coupling piece 44. The sphere 471b is fitted in a spherical concave portion 472a formed on the sphere receiving member 472. The sphere 471b is rotated in the spherical concave portion 472a so that the shaft portion 471a can be tilted.

The interval adjusting portion 48 is constituted by a nut member 481 supported on the coupling piece 45 (46) and an adjusting shaft 482 which is rotatably supported on the rear wall 221 of the lamp body 22. A screw shaft portion 482a of the adjusting shaft 482 is screwed into the nut member 481.

For example, when the adjusting shaft 482 is rotated with respect to the nut member 481 supported on the coupling piece 45, the screw shaft portion 482a is screwed into or back from the nut member 481 depending on a direction of the rotation. Consequently, an interval between the coupling piece 45 and the rear wall 221 of the lamp body 22 is increased or reduced, that is, the coupling piece 45 is moved forward or rearward. Consequently, the bracket 40 is tilted in an almost horizontal direction by setting, as a rotating axis, a line connecting a coupling portion of the sphere 471b of the rotating fulcrum portion and the spherical concave portion 472a to the coupling piece 46. When the adjusting shaft 482 is rotated with respect to the nut member 481 supported on the coupling piece 46, moreover, the screw shaft portion 482a is screwed into or back from the nut member 481 depending on a direction of the rotation. Consequently, an interval between the coupling piece 46 and the rear wall 221 of the lamp body 22 is increased or reduced, that is, the coupling piece 46 is moved forward or rearward. Consequently, the bracket 40 is tilted in an almost vertical direction by setting, as a rotating axis, a line connecting the coupling portion of the sphere 471b of the rotating fulcrum portion and the spherical concave portion 472a to the coupling piece 45.

The biaxial actuator 50 is supported on the bracket 40 at a lower surface side of the lower support piece 43 of the bracket 40. The biaxial actuator 50 is driving means having a first driving mode for rotating the lamp unit 30 along one of two planes which are orthogonal to each other, that is, a vertical plane provided along an optical axis, and a second driving mode for rotating the lamp unit 30 along the other plane, that is, a horizontal plane provided along the optical axis.

The biaxial actuator 50 has a single output shaft 51 for swinging the lamp unit 30 in vertical and horizontal directions, and the output shaft 51 is constituted to be rotated around an axis extended in an almost perpendicular direction and to be moved in a longitudinal direction (a direction perpendicular to the axis of the output shaft 51, that is a forward-backward direction of the vehicle) by means of a driving mechanism constituted in a single case 52. The output shaft 51 is rotatably supported on a slider (not shown) provided movably in the longitudinal direction in the case 52, for example. The output shaft 51 is protruded upward from an inserting hole 521 formed to be extended in the longitudinal direction over the upper surface of the case 52, and has a first engagement portion 511 taking a rectangular shape which is long in an almost longitudinal direction and a second engagement portion 512 protruded toward a side from a central part in the longitudinal direction of the first engagement portion 511. The first engagement portion 511 is formed widely and the second engagement portion 512 is formed like a round bar having a smaller diameter than the width of the first engagement portion 511.

Figure 3:
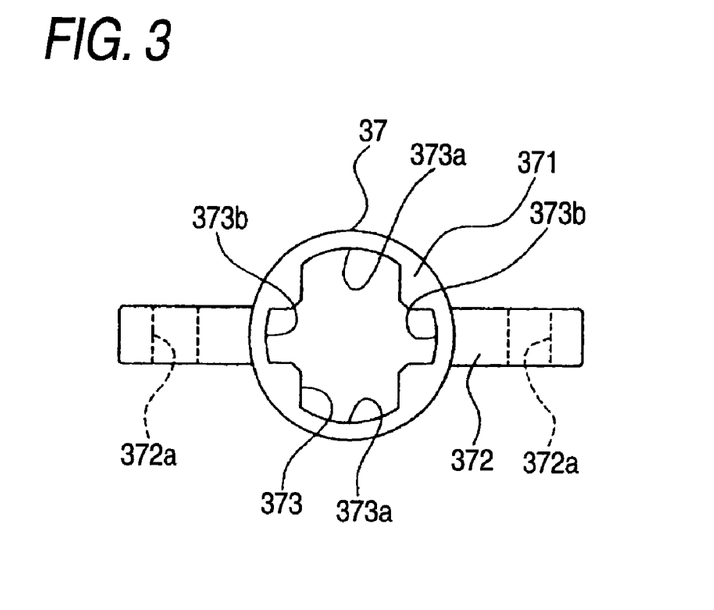
FIG. 3 is a bottom view showing a joint member.

When the biaxial actuator 50 is supported on the lower surface side of the lower support piece 43 of the bracket 40, the output shaft 51 of the biaxial actuator 50 is protruded slightly upward from the inserting hole 431 formed on the lower support piece 43. The output shaft 51 is engaged with the coupling concave portion 373 of the joint member 37 fixed to the lower surface of the lamp unit 30. More specifically, both front and rear ends of the first engagement portion 511 of the output shaft 51 are engaged with the front and rear portions 373a and 373a of the coupling concave portion 373, and both left and right ends of the second engagement portion 512 are engaged with left and right portions 373b and 373b of the coupling concave portion 373.

An interval between the unit receiving portion 421 provided on the bracket 40 and the output shaft 51 of the biaxial actuator 50 is set to have such a dimension that the weight of the lamp unit 30 is not applied to the output shaft 51. Moreover, a depth of the coupling concave portion 373 provided on the lamp unit 30, that is, a dimension in a vertical direction is set to be slightly larger, and the engagement portions 511 and 512 of the output shaft 51 can be moved slightly in the vertical direction in the coupling concave portion 373. Moreover, a length between both front and rear ends of the first engagement portion 511 is smaller than a length between the front and rear portions 373a and 373a of the coupling concave portion and is set to generate a clearance, and the engagement portions 511 and 512 of the output shaft 51 can be slightly rotated in the coupling concave portion 373.

In the headlamp 10, when the output shaft 51 of the biaxial actuator 50 is rotated around its axis extended in an almost vertical direction, a rotating force of the output shaft 51 is transmitted to the lamp unit 30 because the engagement portions 511 and 512 of the output shaft 51 are engaged with the coupling concave portion 373 of the lamp unit 30. Consequently, the rotating shaft 361 is rotated in a state in which the convex spherical surface 362a of the suspended portion 36 of the lamp unit 30 comes in sliding contact with the receiving concave portion 421b of the unit receiving portion 421 of the bracket 40. Accordingly, the lamp unit 30 is swung in a horizontal direction so that an orientation of a beam projected by the lamp unit 30 is changed in the horizontal direction.

When the output shaft 51 is moved in the longitudinal direction (the direction perpendicular to the axis of the output shaft 51, that is the forward-backward direction of the vehicle), moreover, the coupling portion 371 coupled to the output shaft 51 receives a moving force in the longitudinal direction. Consequently, the rotating shaft 361 is rocked in a state in which the convex spherical surface 362a of the suspended portion 36 of the lamp unit 30 comes in sliding contact with the receiving concave portion 421b of the unit receiving portion 421 of the bracket 40. Accordingly, the lamp unit 30 is swung in a vertical direction so that the orientation of the beam projected by the lamp unit 30 is changed in the vertical direction.

In the headlamp 10, the driving portion for rotating the lamp unit 30 in the horizontal direction and the driving portion for tilting the lamp unit 30 in the vertical direction constitute a single member, and the output shaft 51 is also a single member. Consequently, it is possible to decrease the number of components, thereby contributing to a reduction in a cost. Moreover, the lamp unit 30 is supported on the bracket 40 in the suspending state. Therefore, the weight of the lamp unit 30 is not applied to the output shaft 51 of the biaxial actuator 50. Accordingly, an excess load is not applied to the output shaft 51 so that an accurate position control can be carried out.

When the lamp unit 30 is swung in the vertical direction, furthermore, the coupling portion 371 carries out a circular motion and the interval between the coupling portion 371 and the output shaft 51 of the biaxial actuator 50 fluctuates. As described above, however, the output shaft 51 of the coupling portion 371 constitutes a so-called universal joint and the engagement portions 511 and 512 of the output shaft 51 are moved slightly in the vertical direction in the coupling concave portion 373 and can be rotated. Therefore, a bias between the moving locus of the coupling portion 371 with the rotation and that of the output shaft 51 moved linearly in the longitudinal direction does not apply a load to the output shaft 51. Also in this respect, it is possible to carry out an accurate position control.

Figure 5:
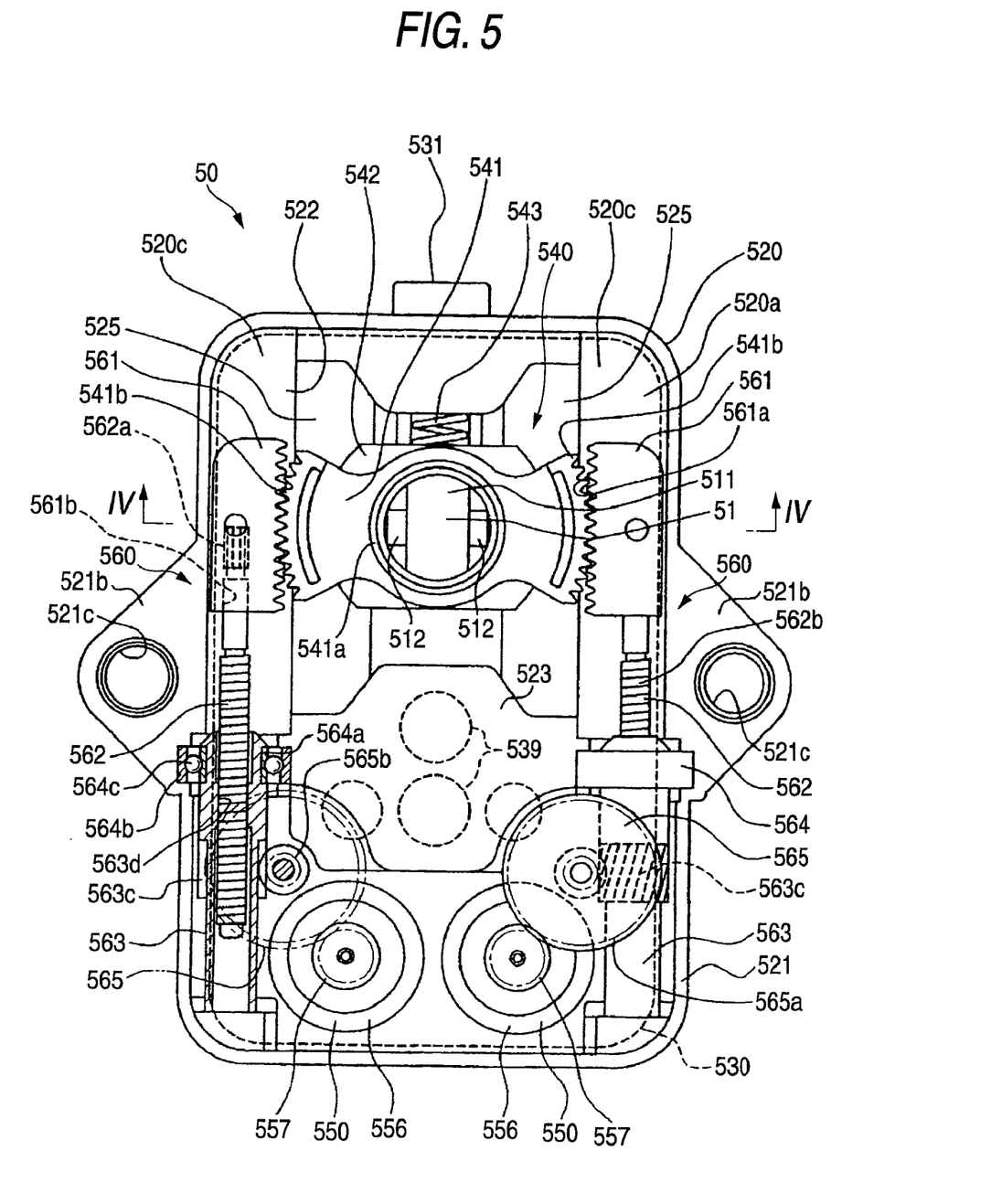
FIG. 5 is a plan view showing an example of an irradiating direction adjusting device together with FIG. 6, illustrating a mechanism portion.
Figure 6:
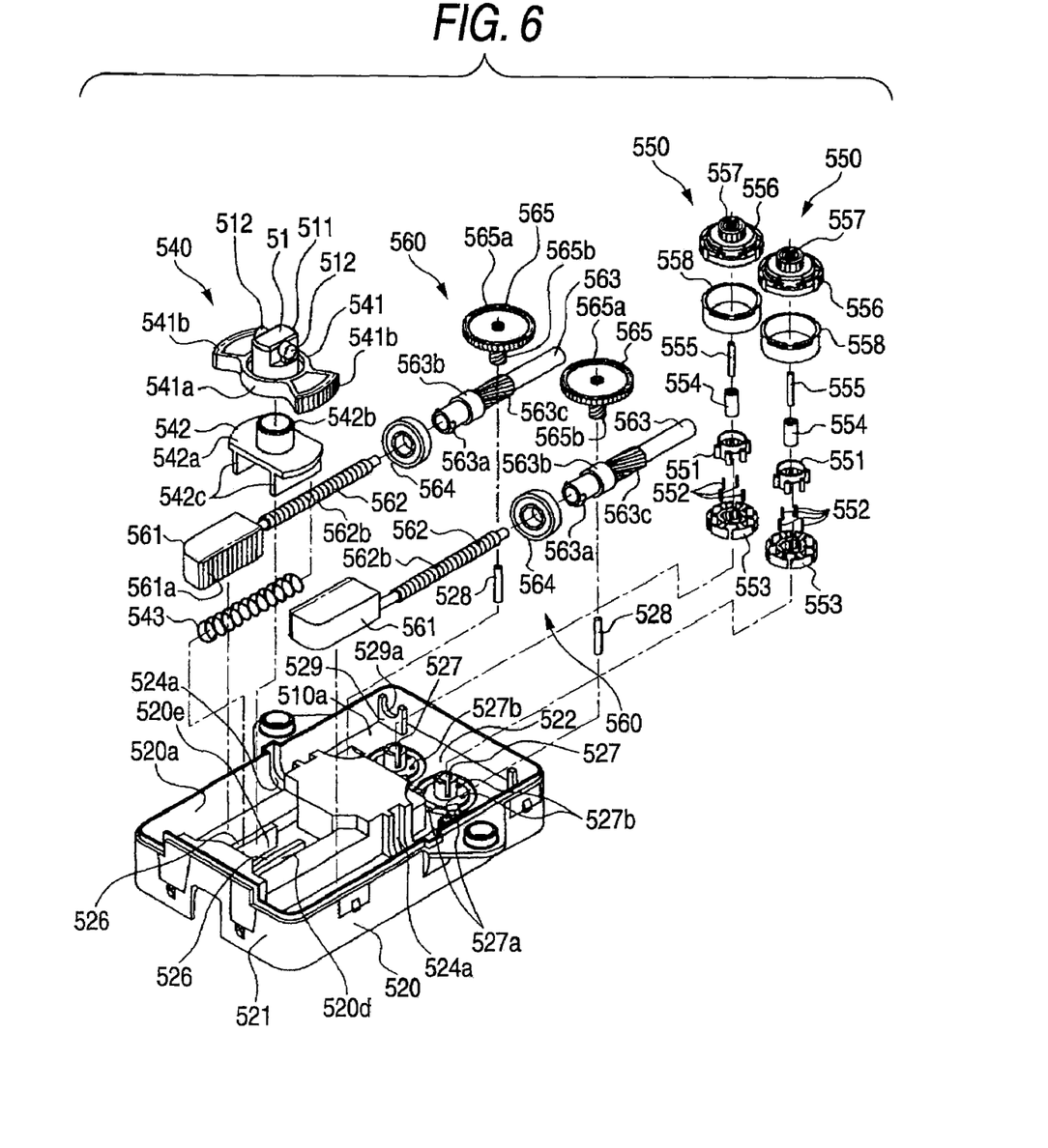
FIG. 6 is an exploded perspective view.

Referring to FIGS. 5 and 6, description will be given to an example of the biaxial actuator 50.

The biaxial actuator 50 incorporates a mechanism portion having two functions in the case 52.

The mechanism portion is constituted by an output portion 540, a driving source 550, and a driving force transmitting portion 560 for transmitting a driving force of the driving source 550 to the output portion 540.

The output portion 540 is constituted by an output gear 541, a slide base 542 and a helical compression spring 543. The output gear 541 is constituted by integrally forming a coupling portion 541a taking an almost cylindrical shape and sector gear portions 541b and 541b protruded from a lower end of the coupling portion 541a in opposite directions to each other, and the output shaft 51 having the first engagement portion 511 and the second engagement portion 512 is formed integrally with an upper end of the coupling portion 541a.

The slide base 542 has a cylindrical fitting portion 542b protruded upward from a center of an upper surface of a plate-shaped base 542a and two plate-shaped sliding legs 542c and 542c protruded downward from a lower surface of the base 542a apart from each other in a horizontal direction, and a receiving plate (not shown) is formed between rear ends of the two sliding legs 542c and 542c. In the slide base 542, the sliding legs 542c and 542c are slidably engaged with sliding grooves 520d and 520d of a main case body 520 (only one of which is shown in FIG. 6). Moreover, the receiving plate (not shown) formed between the rear ends of the sliding legs 542c and 542c is positioned in a space between protruded walls 526 and 526 of the main case body 520 and a central base portion 523. The receiving plate does not collide with the rear ends of the protruded walls 526 and 526 until the slide base 542 is moved to a front end of a moving range. The helical compression spring 543 is disposed in a spring arranging space 520e of the main case body 520 and is compressed between the receiving plate of the slide base 542 and an internal surface of a front end of the outer peripheral wall 521 of the main case body 520. Accordingly, the slide base 542 is energized rearward by means of the helical compression spring 543.

As described above, the coupling portion 541a of the output gear 541 is externally fitted in the fitting portion 542b of the slide base 542 which is disposed in a mechanism arranging space 510a of a case 510. Consequently, the output gear 541 is moved in a longitudinal direction together with the slide base 542 and is rotatably supported around an axis of the fitting portion 542b with respect to the slide base 542.

The driving sources 550 and 550 are constituted as brushless motors. Since the two brushless motors 550 and 550 have the same structures, one of them will be described below. An insulator 551 is fixed to a support cylinder 527 protruded from an intermediate wall 522 of the main case body 520 in an external fitting state. Lower ends of four terminals 552, 552, . . . supported on the insulator 551 are inserted through inserting holes 527b, 527b, . . . formed on the intermediate wall 522 and are protruded into a circuit arranging portion formed on a lower side of the intermediate wall 522, and furthermore, are connected to a connecting conductor of a circuit board (not shown) disposed in the circuit arranging portion. A core 553 is fixed to the main case body 520 so as to be positioned on an outside of the insulator 551 and a coil (not shown) is wound around the core 553. A power is supplied to the coil through the terminals 552, 552, . . . . A stator portion of the brushless motor 550 is constituted by the insulator 551, the terminals 552, 552, . . . , the core 553 and the coil.

A bearing metal 554 is fixed to the support cylinder 527 in an inner fitting state, and a shaft 555 is rotatably supported on the bearing metal 554. A rotor member 556 is fixed to an upper end of the shaft 555. A pinion gear 557 is formed integrally with a central part of an upper surface of the rotor member 556. Reference numeral 558 denotes a rotor magnet formed almost cylindrically and polarized alternately in a circumferential direction, and an upper end thereof is fixed to an outer peripheral portion of the rotor member 556. Consequently, the magnet 558 is positioned to surround the core 553 from an outside, and a lower end of the rotor magnet 558 is opposed to a hole unit (not shown) on the circuit board through facing holes 527a, 527a and 527a formed on the intermediate wall 522 of the main case body 520.

When an electricity is applied to the coil (not shown) wound around the core 553 through the terminals 552, 552, . . . , accordingly, a rotating force is generated in the rotor magnet 558 and a rotor constituted by the rotor magnet 558, the rotor member 556 and the shaft 555 is rotated.

Since a pair of driving force transmitting portions 560 is disposed on left and right and has entirely the same structure except that left and right portions have shapes which are symmetrical about left and right surfaces, one of them will be described below.

The driving force transmitting portion 560 has a rack member 561 disposed movably in the longitudinal direction in sliding spaces 520c and 520c of the case 510. The rack member 561 takes a rectangular shape which is long in the longitudinal direction, and a rack tooth 561a is formed on one of side surfaces. The rack member 561 is a moving portion to be moved by the driving source 550. The driving portion is to include the rack member 561 to be the moving portion and the driving source 550. The rack member 561 is provided with push-in holes 561b and 561b (only one of them is shown in FIG. 5) opened at a rear end and arranged vertically. A push-in portion 562a is formed on a front end of a lead screw 562. The push-in portion 562a is pushed into a push-in hole on a lower side of the rack member 561 so that the rack member 561 is fixed to a front end of the lead screw 562. A screw bar 562b is formed in most of parts excluding the push-in portion 562a in the lead screw 562. As described above, the push-in holes 561b and 561b are formed in two upper and lower stages of the rack member 561 so that the rack members 561 and 561 to be used on left and right can have identical structures. More specifically, also in the case in which a connection to the lead screw 562 is carried out in a downward biased position, it is possible to use the same rack member 561 on both left and right by symmetrically arranging members to be disposed on left and right.

The lead screw 562 is fed in the longitudinal direction by means of a cylindrical gear 563. The cylindrical gear 563 is formed like a long cylinder in the longitudinal direction and includes a stopper projection 563a formed on an outer peripheral surface of a front end thereof, and a large diameter portion 563b having an outside diameter increased is formed in a slightly rearward position from the stopper projection 563a and a helical gear 563c is formed on a rear side of the large diameter portion 563b. A screw groove 563d is formed on an inner peripheral surface of the cylindrical gear 563.

A ball bearing 564 is externally fitted in the front end of the cylindrical gear 563. The ball bearing 564 is formed by enclosing a plurality of balls 564c, 564c, . . . between an inner lace 564a and an outer lace 564b, and the outer lace 564b and the inner lace 564a are constituted to be mutually rotatable. The inner lace 564a is externally fitted between the stopper projection 563a on the front end of the cylindrical gear 563 and the large diameter portion 563b. Consequently, the ball bearing 564 is inhibited from slipping from the cylindrical gear 563.

The screw bar 562b of the lead screw 562 is screwed into the screw groove 563d of the cylindrical gear 563, the outer lace 564b of the ball bearing 564 is engaged into an engagement groove 524 formed from the central base portion 523 of the case 510 to an internal surface of the outer peripheral wall 521 and the rear end of the cylindrical gear 563 is received by a receiving surface 529a of a receiving portion 529 formed on the internal surface of the rear end of the outer peripheral wall 521 of the main case body 520. Consequently, the cylindrical gear 563 is disposed rotatably in the case 510.

Reference numerals 565 and 565 denote transmission gears. Since the same transmission gear is used on left and light, one of them will be described below. The transmission gear 565 serves to transmit the rotation of the brushless motor 550 to the cylindrical gear 563. The transmission gear 565 is constituted by integrally forming a flat gear 565a and a cylindrical worm gear 565b protruded downward from a lower surface of a central part of the flat gear 565a. The worm gear 565b is externally fitted rotatably from the intermediate wall 522 of the main case body 520 to an erected support cylinder 528. The worm gear 565b is mated with the bevel gear 563c of the cylindrical gear 563 and the flat gear 565a is mated with the pinion gear 557 of the motor 550.

A beam irradiating direction is adjusted by the biaxial actuator 50 in the following manner.

In the case in which the beam irradiating direction is tilted into a vertical direction, the two motors 550 and 550 are driven in such a manner that the two rack members 561 and 561 are moved in phase, that is, the two rack members 561 and 561 are moved forward or rearward together. When the motors 550 and 550 are driven, the rotation of the rotor magnets 558 and 558 is transmitted to the flat gears 565a and 565a of the transmission gears 565 and 565 through the pinion gears 557 and 557 and the bevel gears 563c and 563c of the cylindrical gears 563 and 563 are fed by the worm gears 565b and 565b to be rotated together with the flat gears 565a and 565a so that the cylindrical gears 563 and 563 are rotated. When the cylindrical gears 563 and 563 are rotated, the screw bars 562b and 562b of the lead screws 562 and 562 mated with the screw grooves 563d and 563d are fed in the longitudinal direction. Therefore, the rack members 561 and 561 fixed to the front ends of the lead screws 562 and 562 are moved forward or rearward in the sliding spaces 520c and 520c. The two rack members 561 and 561 are moved together forward or rearward so that the output gear 541 having the sector gear portions 541b and 541b mated with the rack teeth 561a and 561a of the rack members 561 and 561 is moved forward or rearward.

As described above, when the output gear 541 of the biaxial actuator 50 is moved forward or rearward, the lamp unit 30 is tilted in the vertical direction. Consequently, the irradiating direction is changed into an upward direction or a downward direction.

When the beam irradiating direction is to be rotated in a horizontal direction, the two motors 550 and 550 are driven in such a manner that the two rack members 561 and 561 are moved in opposite phases to each other, that is, one of the rack members 561 is moved forward and the other rack member 561 is moved rearward. The driving operation of the two motors 550 and 550 appears as the movement of the rack members 561 and 561 through the transmission path, and the left and right rack members 561 and 561 are moved in opposite directions to each other so that the output gear 541 is rotated without a movement in the longitudinal direction. Consequently, the lamp unit 30 is swung in the horizontal direction and the irradiating direction is changed in a rightward direction or a leftward direction.

Figure 7:
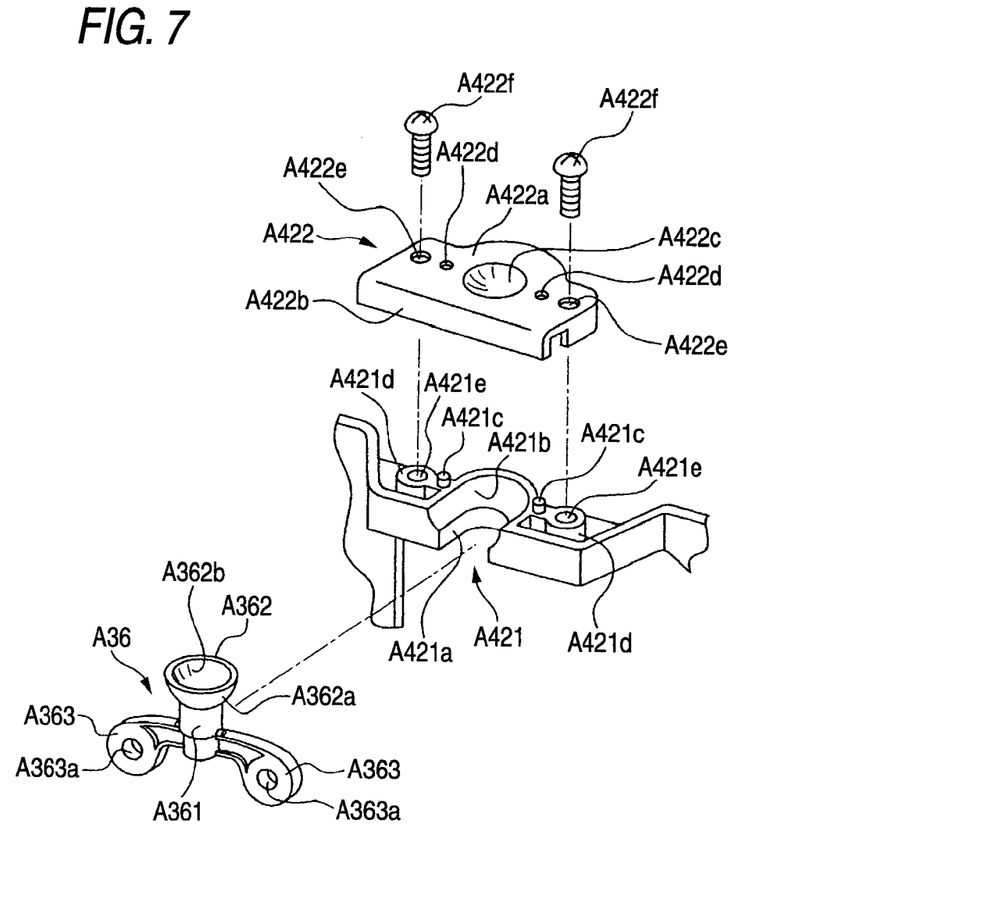
FIG. 7 is an exploded perspective view showing a variant of the unit receiving portion and the suspended portion together with FIG. 8, illustrating main parts.
Figure 8:
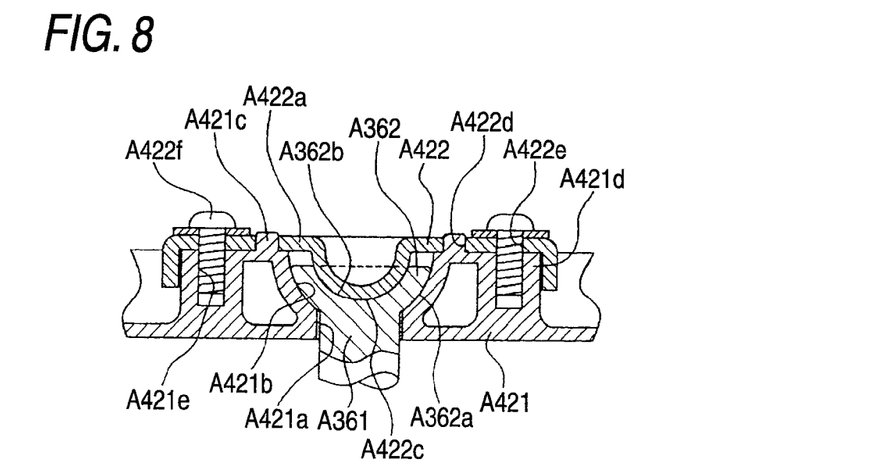
FIG. 8 is an enlarged sectional view showing an assembling state.

FIGS. 7 and 8 show a variant of the unit receiving portion and the suspended portion.

A suspended portion A36 is constituted by integrally forming a rotating shaft A361 extended in an almost vertical direction, a supported portion A362 formed integrally with an upper end of the rotating shaft A361, and supported pieces A363 and A363 protruded from a lower end of the rotating shaft A361 in an almost horizontal direction. The supported portion A362 takes a hemispherical shape having a larger diameter than the rotating shaft A361 and has a lower surface provided with a convex spherical surface A362a protruded hemispherically downward. Accordingly, the rotating shaft A361 takes a downward protruded shape from the central part of the convex spherical surface A362a. Moreover, a pressed concave portion A362b opened upward and taking a hemispherical shape is formed on an upper surface of the supported portion A362. Inserting holes A363a and A363a are formed on tip portions of the supported pieces A363 and A363. A fixing screw (not shown) inserted through the inserting holes A363a and A363a of the supported pieces A363 and A363 from a front is screwed into a screw hole of a shaft fixing portion (not shown) formed on a shade. Consequently, the suspended portion A36 is fixed to the upper end of the lamp unit through the shade.

A notch A421a opened forward and taking an almost U shape seen from above is formed on a unit receiving portion A421 formed on an upper support piece of a bracket which is not shown, and an upper surface A421b in a portion provided along an edge of the notch A421a is set to be a receiving concave portion and the receiving concave portion A421b is formed to be a concave spherical surface having an almost equal curvature to the curvature of the convex spherical surface A362a of the suspended portion A36. Moreover, positioning projections A421c and A421c are protruded from both sides of the receiving concave portion A421b on the upper surface of the unit receiving portion A421, fixing bosses A421d and A421d are protruded from an outside of the positioning projections A421c and A421c, and screw holes A421e and A421e opened to the upper surface are formed on the fixing bosses A421d and A421d.

The rotating shaft A361 of the suspended portion A36 fixed to a lamp unit (not shown) is inserted into the notch A421a of the unit receiving portion A421 from a front, and the convex spherical surface A362a of the supported portion A362 is mounted on the receiving concave portion A421b of the unit receiving portion A421 in a state in which the rotating shaft A361 reaches an inner part of the notch A421a. Consequently, the whole weight of the lamp unit is received by the receiving concave portion A421b of the unit receiving portion A421 through the convex spherical surface A362a of the suspended portion A36. More specifically, the lamp unit is supported on the upper support piece of the bracket in a suspending state. The convex spherical surface A362a comes in sliding contact with the receiving concave portion A421b so that the lamp unit can be swung in vertical and horizontal directions.

A regulating member A422 formed of a metal is fixed to the unit receiving portion A421. Consequently, it is possible to prevent the suspended portion A36 from slipping from the unit receiving portion A421. The regulating member A422 has such a structure that an upper surface portion A422a for covering an upper side of the unit receiving portion A421 is formed integrally with a front surface portion A422b protruded downward from a front edge of the upper surface portion A422a, a pressing protrusion A422c protruded downward is formed in an almost central part of the upper surface portion A422a and a lower surface of the pressing protrusion A422c is formed hemispherically. Moreover, the upper surface portion A422a has positioning holes A422d and A422d formed on both sides of the pressing protrusion A422c and screw inserting holes A422e and A422e formed on an outside of the positioning holes A422d and A422d.

As described above, in a state in which the suspended portion A36 is supported on the unit receiving portion A421, the upper sides of the supported portion A362 and the pressed concave portion A362b of the suspended portion A36 are covered with the upper surface portion A422a and the pressing protrusion A422c of the regulating member A422, the positioning projections A421c and A421c of the unit receiving portion A421 are engaged with the positioning holes A422d and A422d and are positioned with respect to the unit receiving portion A421, and furthermore, fixing screws A422f and A422f are inserted through the screw inserting holes A422e and A422e from above and are screwed into the screw holes A421e and A421e of the fixing bosses A421d and A421d of the unit receiving portion A421 so that the regulating member A422 is thus fixed to the unit receiving portion A421. Consequently, it is possible to prevent the suspended portion A36 from slipping from the unit receiving portion A422. The upper surface portion A422a functions as a regulating portion for regulating the slip and looseness of the convex spherical surface A362a from the receiving concave portion A421b.

Figure 9:
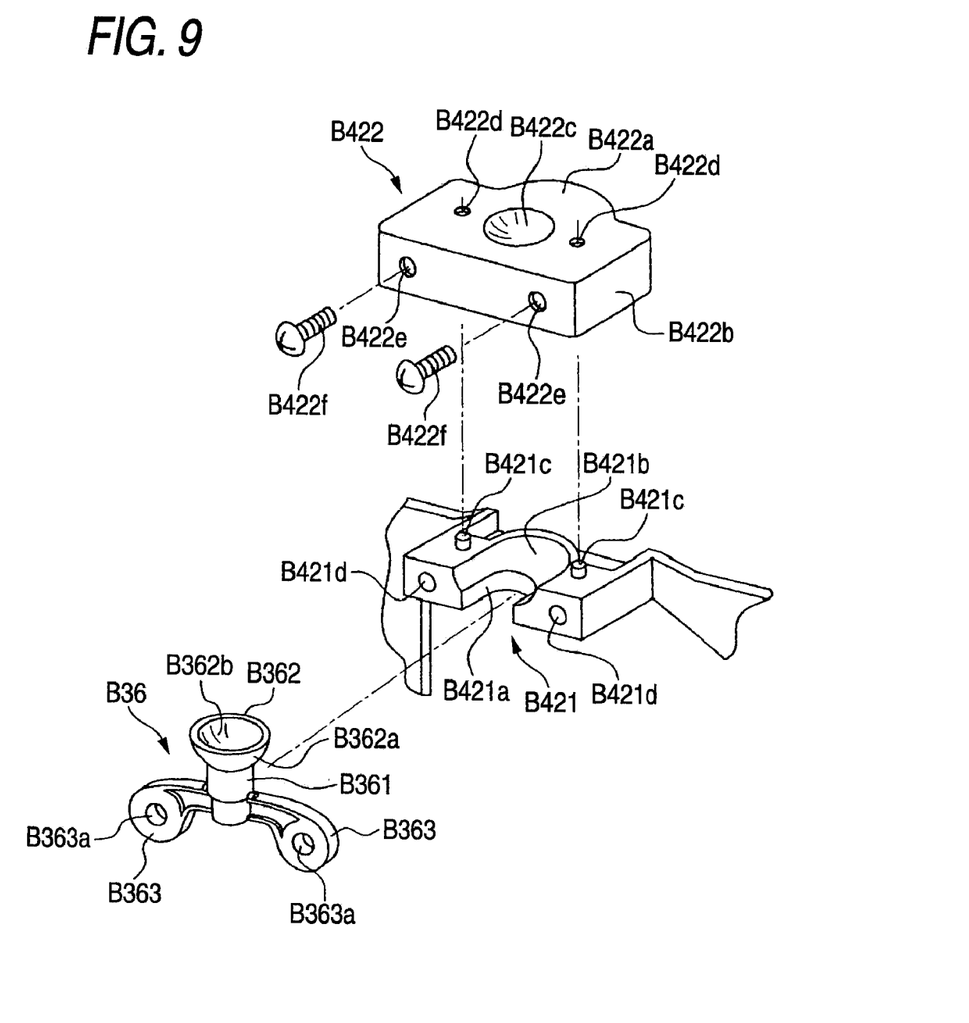
FIG. 9 is a view showing another variant of the unit receiving portion and the suspended portion together with FIGS. 10 and 11, illustrating main parts.
Figure 10:
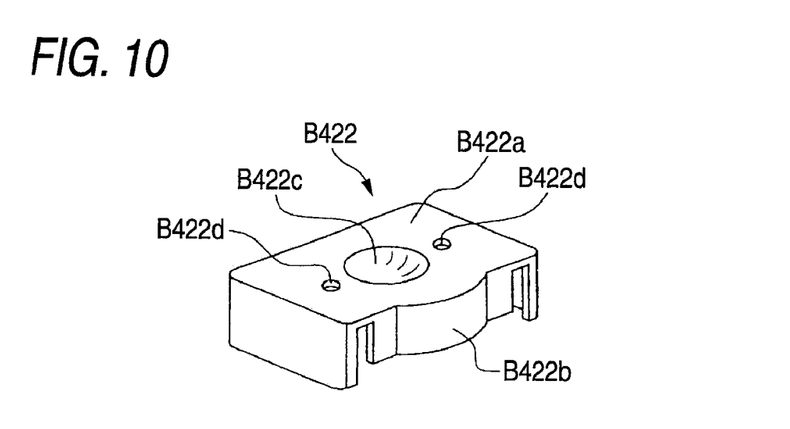
FIG. 10 is a perspective view showing a regulating member seen on an opposite side from FIG. 9.
Figure 11:
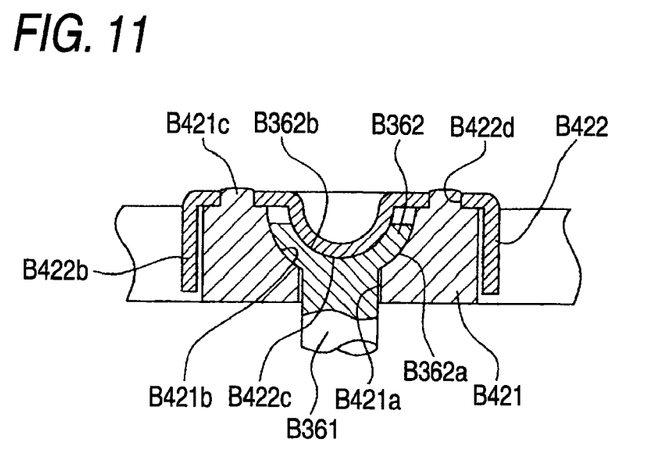
FIG. 11 is an enlarged sectional view showing an assembling state.

FIGS. 9 to 11 show another variant of the unit receiving portion and the suspended portion.

A suspended portion B36 is the same as the suspended portion A36.

The suspended portion B36 is constituted by integrally forming a rotating shaft B361 extended in an almost vertical direction, a supported portion B362 formed integrally with an upper end of the rotating shaft B361, and supported pieces B363 and B363 protruded from a lower end of the rotating shaft B361 in an almost horizontal direction. The supported portion B362 takes a hemispherical shape having a larger diameter than the rotating shaft B361 and has a lower surface provided with a convex spherical surface B362a protruded hemispherically downward. Accordingly, the rotating shaft B361 takes a downward protruded shape from the central part of the convex spherical surface B362a. Moreover, a pressed concave portion B362b opened upward and taking a hemispherical shape is formed on an upper surface of the supported portion B362. Inserting holes B363a and B363a are formed on tip portions of the supported pieces B363 and B363. A fixing screw (not shown) inserted through the inserting holes B363a and B363a of the supported pieces B363 and B363 from a front is screwed into a screw hole of a shaft fixing portion (not shown) formed on a shade. Consequently, the suspended portion B36 is fixed to the upper end of the lamp unit through the shade.

A notch B421a opened forward and taking an almost U shape seen from above is formed on a unit receiving portion B421 formed on an upper support piece of a bracket which is not shown, and an upper surface B421b in a portion provided along an edge of the notch B421a is set to be a receiving concave portion and the receiving concave portion B421b is formed to be a concave spherical surface having an almost equal curvature to the curvature of the convex spherical surface B362a of the suspended portion B36. Moreover, positioning projections B421c and B421c are protruded from both sides of the receiving concave portion B421b on the upper surface of the unit receiving portion B421. In addition, screw holes B421d and B421d are formed in positions interposing the notch B421a on the front end of the unit receiving portion B421.

The rotating shaft B361 of the suspended portion B36 fixed to a lamp unit (not shown) is inserted into the notch B421a of the unit receiving portion B421 from a front, and the convex spherical surface B362a of the supported portion B362 is mounted on the receiving concave portion B421b of the unit receiving portion B421 in a state in which the rotating shaft B361 reaches an inner part of the notch B421a. Consequently, the whole weight of the lamp unit is received by the receiving concave portion B421b of the unit receiving portion B421 through the convex spherical surface B362a of the suspended portion B36. More specifically, the lamp unit is supported on the upper support piece of the bracket in a suspending state. The convex spherical surface B362a comes in sliding contact with the receiving concave portion B421b so that the lamp unit can be tilted in vertical and horizontal directions.

A regulating member B422 formed of a metal is fixed to the unit receiving portion B421. Consequently, it is possible to prevent the suspended portion B36 from slipping from the unit receiving portion B421. The regulating member B422 has such a structure that an upper surface portion B422a for covering an upper side of the unit receiving portion B421 is formed integrally with a peripheral wall portion B422b protruded downward from a peripheral edge of the upper surface portion B422a, a pressing protrusion B422c protruded downward is formed in an almost central part of the upper surface portion B422a and a lower surface of the pressing protrusion B422c is formed hemispherically. Moreover, the upper surface portion B422a has positioning holes B422d and B422d formed on both sides of the pressing protrusion B422c. Two screw inserting holes B422e and B422e are formed on the front surface portion of the peripheral wall portion B422b apart from each other in a horizontal direction.

As described above, in a state in which the suspended portion B36 is supported on the unit receiving portion B421, the upper sides of the supported portion B362 and the pressed concave portion B362b of the suspended portion B36 are covered with the upper surface portion B422a and the pressing protrusion B422c of the regulating member B422, the positioning projections B421c and B421c of the unit receiving portion B421 are engaged with the positioning holes B422d and B422d and are positioned with respect to the unit receiving portion B421, and furthermore, fixing screws B422f and B422f are inserted through the screw inserting holes B422e and B422e from a front and are screwed into the screw holes B421d and B421d of the unit receiving portion B421 so that the regulating member B422 is thus fixed to the unit receiving portion B421. Consequently, it is possible to prevent the suspended portion B36 from slipping from the unit receiving portion B422. The upper surface portion B422a and the pressing protrusion B422c function as regulating portions for regulating the slip and looseness of the convex spherical surface B362a from the receiving concave portion B421b.

Figure 12:
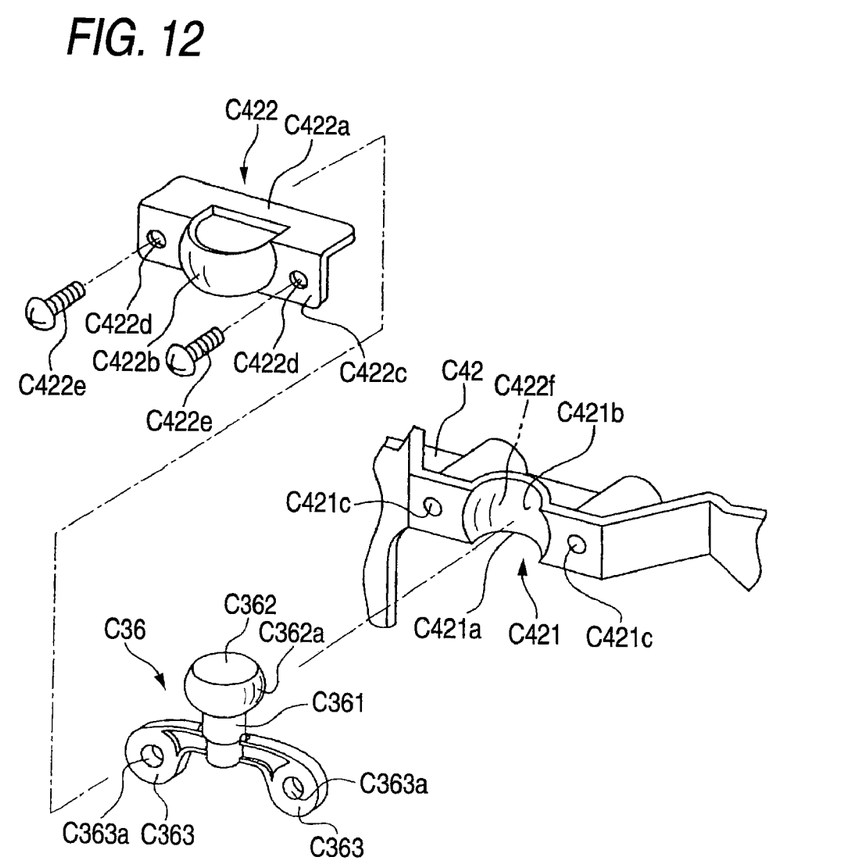
FIG. 12 is an exploded perspective view showing a further variant of the unit receiving portion and the suspended portion.

FIG. 12 shows a further variant of the unit receiving portion and the suspended portion.

A suspended portion C36 is constituted by integrally forming a rotating shaft C361 extended in an almost vertical direction, a supported portion C362 formed integrally with an upper end of the rotating shaft C361, and supported pieces C363 and C363 protruded from a lower end of the rotating shaft C361 in an almost horizontal direction. The supported portion C362 is formed on a convex spherical surface C362a in which an outer peripheral surface portion of a thick disc having a larger diameter than the diameter of the rotating shaft C361 constitutes a part of the spherical surface. Inserting holes C363a and C363a are formed on the tip portions of the supported pieces C363 and C363. Fixing screws (not shown) inserted through the inserting holes C363a and C363a of the supported pieces C363 and C363 from a front are screwed into screw holes of a shaft fixing portion (not shown) formed on a shade. Consequently, the suspended portion C36 is fixed to the upper end of the lamp unit through the shade.

A unit receiving portion C421 is formed between an upper support piece C42 of a bracket and a regulating member C422 fixed to a front end of the upper support piece C42.

A notch portion C421a taking an almost semicircular shape seen from above is formed on the front end of the upper support piece C42, and a side surface C421b of the semicircular notch portion C421a is formed to be a concave spherical surface constituting a part of a spherical surface. Moreover, screw holes C421c and C421c are formed in positions interposing the notch portion C421a on the front end of the upper support piece C42.

The regulating member C422 is constituted by integrally forming a semicircular pressing portion C422b protruded forward from a front edge of an upper surface portion C422a taking a shape of a plate and fixing portions C422c and C422c positioned on both sides of the pressing portion C422b. A rear surface of the pressing portion C422b is formed to be a concave spherical surface constituting a part of the spherical surface, and furthermore, screw inserting holes C422d and C422d are formed on the fixing portions C422c and C422c.

A rear half of the convex spherical surface C362a of the suspended portion C36 is applied to the concave spherical surface C421c of the upper support piece C42, and the upper surface portion C422a of the regulating member C422 is positioned on an upper side of the supported portion C362 of the suspended portion C36 in that state, and a rear surface (a concave spherical surface) of the pressing portion C422b is applied to a front half of the convex spherical surface of the suspended portion C36, and furthermore, fixing screws C422e and C422e are inserted through the screw inserting holes C422d and C422d of the regulating member C422 from a front and are screwed into the screw holes C421c and C421c of the upper support piece C42 so that the regulating member C422 is fixed to the upper support piece C42. Consequently, the unit receiving portion C421a is formed by the upper support piece C42 and the regulating member C422, and the convex spherical surface C362a of the suspended portion C36 is slidably supported on a receiving concave portion C422f formed by the concave spherical surface C421b and the rear surface of the pressing portion C422b of the regulating member C422.

While the description has been given to the structure in which the lamp unit is supported on the bracket in the suspending state in the exemplary embodiment, the lamp unit may be directly supported on the lamp body in the suspending state without using the bracket.

It will be apparent to those skilled in the art that various modifications and variations can be made to the described exemplary embodiments of the present invention without departing from the spirit or scope of the invention. Thus, it is intended that the present invention cover all modifications and variations of this invention consistent with the scope of the appended claims and their equivalents.

DESCRIPTION OF THE REFERENCE NUMERALS AND SIGNS

10: headlamp for automobile (vehicle lamp)
21: lamp housing
22: lamp body
23: transparent cover
30: lamp unit
36: suspended portion
362a: convex spherical surface
421: unit receiving portion
421b: receiving concave portion
422c: pressing piece (regulating portion)
422d: pressing piece (regulating portion)
50: biaxial actuator (irradiating direction adjusting device)
51: output shaft
52: case
542: slide base (slider)
A36: suspended portion
A362a: convex spherical surface
A362b: pressed concave portion
A421: unit receiving portion
A421b: receiving concave portion
A422a: upper surface portion (regulating portion)
A422c: pressing protrusion
B36: suspended portion
B362a: convex spherical surface
B362b: pressed concave portion
B421: unit receiving portion
B422a: upper surface portion (regulating portion)
B422c: pressing protrusion
C36: suspended portion
C421: unit receiving portion

What is claimed is:

1. A vehicle lamp comprising:
a lamp housing formed by a lamp body and a cover for covering a front side of the lamp body;
a lamp unit configured to irradiate a light forward and suspended in the lamp housing to be swung in vertical and horizontal directions; and
an irradiating direction adjusting device configured to swing the lamp unit in the vertical and horizontal directions;
wherein the irradiating direction adjusting device includes an output shaft coupled to a lower end of the lamp unit, the lamp further comprising a case disposed in the lamp housing; and
a slider provided in the case and capable of sliding in the direction perpendicular to the axis, wherein the output shaft is supported on the slider and rotatable with respect to the slider,
wherein the output shaft is capable of rotating on its axis and sliding in a direction perpendicular to the axis, and
wherein the lamp unit is swung in the horizontal direction by transmitting a rotation of the output shaft to the lamp unit and is swung in the vertical direction by sliding the output shaft in the direction perpendicular to the axis.

2. A vehicle lamp comprising:
a lamp housing formed by a lamp body and a cover for covering a front side of the lamp body;
a lamp unit configured to irradiate a light forward and suspended in the lamp housing to be swung in vertical and horizontal directions; and
an irradiating direction adjusting device configured to swing the lamp unit in the vertical and horizontal directions;
wherein the irradiating direction adjusting device includes an output shaft coupled to a lower end of the lamp unit,
wherein the output shaft is capable of rotating on its axis and sliding in a direction perpendicular to the axis,
wherein the lamp unit is swung in the horizontal direction by transmitting a rotation of the output shaft to the lamp unit and is swung in the vertical direction by sliding the output shaft in the direction perpendicular to the axis,
wherein an upper end of the lamp unit is provided with a suspended portion having a downward convex spherical surface, and
an inside of the lamp housing is provided with a unit receiving portion having a hemispherical receiving concave portion with which the convex spherical surface comes in sliding contact, and a regulating portion for regulating an upward movement of the suspended portion.

3. The vehicle lamp according to claim 2, wherein the suspended portion comprises a hemispherical presses concave portion formed on an upper surface of the suspended portion, and
the regulating portion comprises a hemispherical pressing protrusion to come in sliding contact with the pressed concave portion.

4. The vehicle lamp according to claim 3, wherein the regulating portion is fixed to the unit receiving portion from a forward side with a screw.

* * * * *